July 17, 1962 R. L. PROPST 3,044,306
POWER METER
Filed April 22, 1960
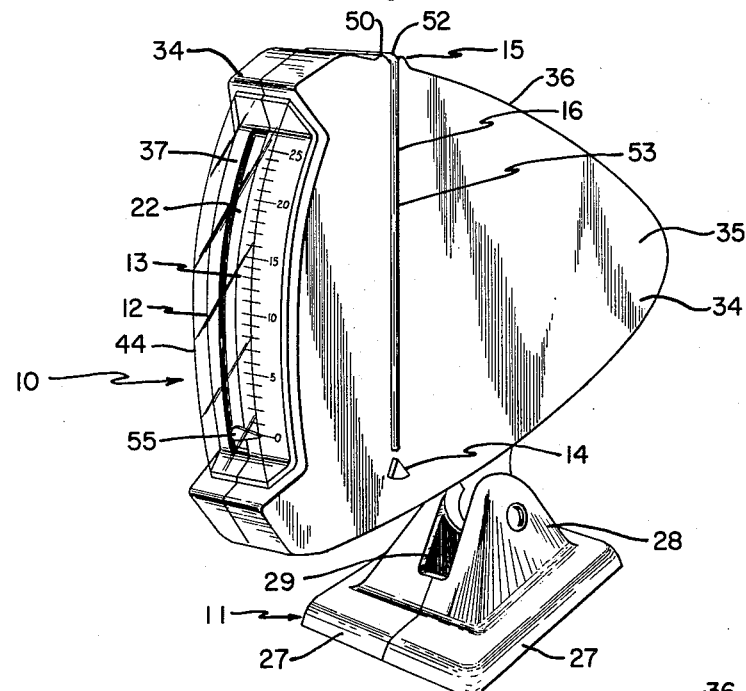
Fig. 1
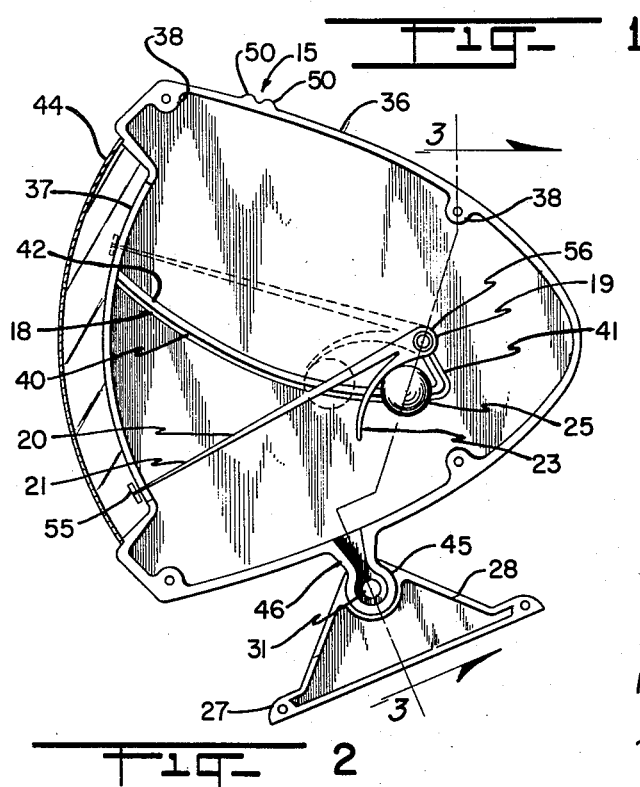
Fig. 2
Fig. 3
INVENTOR.
ROBERT L. PROPST
BY
Philip H. Sheridan
ATTORNEY

POWER METER

Robert L. Propst, Englewood, Colo.
(2347 Londonderry, Ann Arbor, Mich.)
Filed Apr. 22, 1960, Ser. No. 24,094
2 Claims. (Cl. 73—514)

This invention relates to a novel and improved power meter adaptable for use in testing vehicle performance, and more particularly relates to a novel and improved instrument specifically adapted for measuring acceleration and deceleration characteristics of an automobile so as to provide a ready indication of automobile performance in a simple and low cost manner.

The instrument of the present invention is designed for installation in a motor vehicle in such a way as to give the operator of a vehicle a continuous, clear indication of the vehicle's day to day performance, and this is accomplished primarily by making the instrument readily responsive to acceleration or deceleration characteristics of the motor vehicle under operating conditions. In addition, through the design and construction of the present invention vehicle performance can be compared directly with other cars and such performance can be tested at relatively low speeds of operation if desired, or in accord with conventional practice car performance characteristics can be measured with maximum acceleration under selected gearing and within specified speed limits.

Accordingly, it is a primary object of the present invention to provide for a greatly simplified, durable and inexpensive device which is adapted for installation in a motor vehicle for the purpose of measuring acceleration and deceleration characteristics thereof and in such a way as to provide a continuous indication to the operator of the performance, and moreover to accomplish the above at low range speeds of operation of the motor vehicle.

It is another object to provide for a power meter for use in a vehicle and the like which may be rapidly and easily installed, levelled and calibrated to provide a continuous accurate reading of the rate of change in velocity of the vehicle under operating conditions.

It is a further and more specific object of the present invention to provide in a power meter instrument for measuring acceleration and deceleration characteristics of an automobile and the like a novel and improved way of mounting a rolling member responsive to velocity changes of the vehicle so as to greatly minimize friction therein and to enable ready response to even small changes in velocity at low rates of speed, and furthermore, to enable direct translation of such responses to velocity changes into an indicator, also partially responsive to changes in velocity, in order to permit a ready and accurate means of visually reading and recording such changes.

It is a still further object to provide in a power meter installation a way of mounting an inertia member adapted to be responsive to acceleration or deceleration characteristics (whichever is desired) of the motor vehicle in a substantially frictionless manner, but in such a way that the dampening effect on the inertia member may be selectively varied depending upon varying operating conditions of the vehicle in which it is installed, together with a quick and easy way of installing and leveling the entire instrument and wherein the instrument housing itself is so constructed and arranged as to be conformable for installation at varying angles without affecting its performance.

It is an additional object of the present invention to provide in a power meter assembly a novel and improved acceleration and deceleration measuring means together with an indicator, both of which are responsive to changes in velocity of the motor vehicle to provide a continuous and accurate indication thereof.

The above and other objects and advantages of the present invention will become more clearly understood from the following detailed description taken together with the accompanying drawings in which:

FIGURE 1 is a somewhat perspective view illustrating the exterior design and construction of a preferred form of power meter, in accordance with the present invention;

FIGURE 2 is a vertical section view showing the interior of the power meter illustrated in FIGURE 1; and FIGURE 3 is a vertical cross-sectional view taken on line 3—3 of FIGURE 2.

Referring more particularly to the drawings, there is shown by way of illustrative example a preferred form of power meter instrument as generally designated at 10 comprised essentially of a base 11 for purposes of mounting or installation in swivelled relation of an instrument housing 12 of the present invention. Broadly, the instrument housing includes a scale 13 preferably on the front end face thereof and leveling means as defined by a marker 14 and slotted portion 15 in vertical spaced relation to the marker for receipt of a drop-on wire 16. As best seen from FIGURES 2 and 3 there is disposed within the instrument housing 12 a spaced upwardly and forwardly inclining guideway 18 which at its lower end is disposed beneath a bearing portion 19 which is adapted to accommodate the pivotal end of an indicator 20. The indicator 20 is in turn preferably defined by an elongate, relatively forwardly extending thin wire pointer 21 which projects through a vertical slot 22 in the instrument housing and which is caused to move upwardly and downwardly along the scale portion 13 in response to actuation or movement of a lever 23 forming a part of the indicator and extending downwardly across the guideway 18. The spaced guideway 18 is formed to receive a rolling member preferably in the form of a ball 25 in such a way that the rolling member is free to move along the guideway with a minimum of friction and for example due to changes in the rate of speed as imparted to the instrument and with the ball or rolling member being of sufficient weight to easily force the indicator 20 upwardly and forwardly along the guideway ahead of the rolling member. In this relation, the construction of the spaced guideway to be described in detail plays a vital part in defining a way in which the ball is free to move forwardly therealong with a minimum of friction and also in such a way that the forward extent of movement of the ball for a given change in velocity may be selectively varied by varying the dampening effect of the guideway on the ball but at the same time without imposing any greater friction on the ball in moving back and forth. Additionally, the indicator is so designed as to be cooperative with the ball to also be somewhat responsive to changes in velocity and to imposed a minimum resistance on the forward movement of the ball throughout its path of movement.

In the preferred construction and arrangement of the instrument housing, the embodiment illustrated in the drawings will be described in relation to mounting or installation on the dashboard of an automobile with the scale 13 on the instrument housing facing the vehicle operator so as to be easily readable at all times and provide the operator with a constant check on car performance. As stated, the indicator will reflect the movement of the rolling member for a given traversal along the guideway in response to a given change in velocity. Accordingly, the base 11 is formed of a pair of mating halves 27 composed of a suitable metallic or plastic material, such as a high impact styrene and the halves may be assembled together for example through the use of a suitable adhesive to form an upwardly tapering riser portion 28 having an intermediate slotted portion 29 and a spherical recess 30, together with openings 31 to provide respectively for accommodation and connection of the instrument housing in swivelled relation to the base.

In turn, the instrument section 13 is similarly formed of mating, generally cup-shaped halves 34 also composed of some rigid material such as metal or plastic. Each half for example may be molded into the desired configuration to provide a flat side wall 35, rearwardly curving end walls 36 and a frontal or face portion 37. Spaced along the end walls 36 are male and female position indicators 38 for interconnection of the halves, aligned bosses projecting inwardly from the intersurfaces of the side walls 35, and also aligned track portions 40. The tracks 40 curve first downwardly and rearwardly from the aligned bosses, as at 41, then change direction abruptly to extend forwardly along an upwardly curving course of travel in spaced relation to the bosses and toward the front face of the halves as indicated at 42.

The position locators 38 are defined by openings on one side to receive lugs on the other half for interconnection of the halves in aligned relation so that the bosses 39 are also accurately aligned to form the common bearing portion 19.

In connected relation, it will also be noted that the face 37 on one half is formed with the vertical slotted portion 22 extending substantially the length thereof and the opposite half is formed with the vertical graduated scale 13 so as to be disposed directly adjacent to the vertical slotted portion. It will be further seen that the front face 37 forming the vertical slotted portion and scale is slightly raised and this is for the purpose of connection of a clear cover 44 composed of a celluloid or other clear plastic material which is bent to be applied in spaced relation over the scale and slotted portion with the edges of the cover contacting the raised edge portion of the front face. A suitable adhesive can then be used to connect the edge portions and securely position the cover to seal in the scale and vertical slotted portion and prevent the entry of dust and other foreign materials.

Specifically in order to properly mount the housing in adjustable relation the recess 30 is proportioned for insertion of a similarly shaped spherical extremity 45 on leg 46 projecting downwardly from the combined halves 34, and the extremity includes a transverse opening to receive a suitable connecting bolt 48 projecting through the openings 31 and extremities to receive nut 49 and connect the instrument housing in swivelled relation to the base. To properly level the instrument housing in relation to the dashboard, once the base is secured thereto, the levelling means as described is employed to provide the most convenient and simple way of levelling or initially installing the instrument housing so that the pointer 21 will initially rest at "zero" on the scale. For this purpose, the marker 14 may merely consist of an upwardly pointing projection formed on the exterior surface of one sidewall 35 of the housing and the slotted portion 15 may be formed by spaced ridges 50 extending horizontally across the top end walls of the instrument housing in vertical relation to the marker 14. As will be best seen from FIGURE 1, the slotted portion 15 is to accommodate the drop-on wire 16 and this wire merely includes a bent end 52 for extension across the slotted portion together with a perpendicular, relatively long pointer end 53 for extension downwardly along the outside surface of the side wall. Then, to level the drop-on wire and the entire instrument housing it is only necessary to swivel the instrument section in relation to the base until the wire 16 is vertically aligned with the marker 14.

Again referring to the interior design and construction of the instrument housing when the mating halves 34 are connected together, the aligned bosses 39 form the common bearing 19 to receive the pivot end of the indicator 20.

In turn, the track portions are formed to taper inwardly into spaced pointed extremities 54 which actually form the spaced guideway for travel of the rolling member 25. The spacing between the extremities 54 is dictated in accordance with the dimensions of the rolling member so that the pointed extremities will contact opposed sides of the ball or rolling member 25 on the lower half thereof. From this it will be seen that to vary the dampening effect of the spaced guideway on the ball, of course the deeper the ball is suspended in the tracks the more the action of the ball is dampened in rolling up the tracks. In other words, for the ball to move up the track a given distance it must make progressively more turns the deeper it is seated in the track. Nevertheless, even with the greatest dampening effect on the ball it will be seen that line or point contact is maintained between the extremities 54 and the surface of the ball so as not to make it too sluggish in movement while being readily responsive to reaction forces to move by its inertia upwardly along the guideway.

To properly indicate this movement the indicator 20 as stated is formed of a straight pointer 21 which is of a length to extend forwardly through the vertical slotted portion 22 and includes at its tip end a marker 55 which extends across the scale in order to provide an exterior reflection of the movement of the ball 25. In addition, the lever 23 preferably curves forwardly but downwardly from the pointer end across the path of travel of the ball and preferably projects completely through the spaced guideway for a substantial distance so as to maintain contact with the ball completely throughout the guide path. Both the pointer and lever verge into a common pivotal end portion 56 having oppositely extending bearing ends 57 for connection in journaled relation to the bearing 19 so as to make the entire indicator freely pivotal in response to forward rotation of the ball. Of additional importance is the fact that by forming the indicator with the downwardly projecting lever as at 23 this lever will also be somewhat responsive to changes in speed of the vehicle in a manner similar to the ball itself. The advantage of this is that it will tend to move in the same direction as the ball and will offer little resistance to its upward and forward movement. Otherwise, through the use of a pointer alone, since it projects more nearly horizontally from the pivot end it will not be as closely responsive or even responsive at all in a horizontal position to changes in velocity of the vehicle. Yet with the use of the lever, the pointer may be extended substantially in horizontal relation so as to permit easy reading on a vertical scale as reflected by movements of the horizontal pointer in response to movement of the lever and ball.

In a typical manner of installation of the power meter on the dashboard of a motor vehicle, a suitable adhesive material may be applied to the underside of the base or mount and then pressed to the dashboard top or front in a convenient location. Assuming the car is on level ground and if very accurate installation is desired, drop-on wire 16 may be positioned as described and the instrument housing swivelled until the wire pointer lines up with the marker 14 on the housing. The connection bolt 48 is then tightened and the entire installation is properly mounted. At this point, the drop-on wire 16 may be removed and used again only when resetting is necessary. In this connection, the ideal general mounting position would be on top of the dashboard in the general area of the speedometer as in the preferred form where the instrument housing section is connected at its bottom to the base. In this relation and once levelled the entire installation is so calibrated that the pointer should rest at the zero marking on the scale. In calibrating the scale itself this may merely be an arbitrary, comparative selection designed for the purpose of comparing day by day performance of the car so as to detect any changes in response of the indicator for a given change in velocity or acceleration. In general, the relation of the zero point on the meter face and the zero indicator point on the marker 14 can be determined, although it will be evident that the marker may move off the zero point in the event of variation due to changes in the level or grade of the road or highway.

In the construction and assembly of the instrument housing, all parts thereof may be formed of the same material in a single molding operation. The ball or other suitable rolling member, for example a cylindrical member having rounded end portions may be suitably formed of steel or brass, or may if desired be plated and the latter is especially desirable in damp climates where corrosion may affect the performance of the rolling member. In addition, the calibrated face forming the scale 13 on the housing may be formed in a number of ways such as by printing directly on the recessed face portion 37, by use of decals or by adhesive-backed printed paper.

As designed, the power meter of the present invention is specifically adapted for measuring acceleration of the vehicle in that with the scale and guideway directed rearwardly in relation to the forward movement of the car the ball 25 will be urged to move in a rearward direction only in response to increases in velocity, but as soon as the velocity becomes constant or decreases, the ball and lever will immediately return to the position of rest at the lower end of the guideway. It will be apparent however that these conditions may be reversed if desired in order to measure deceleration or braking ability of an automobile such as merely by reversing the entire installation or at least by reversing the disposition of the guideway. In any application, due to its simplicity, inexpensiveness and compact construction, the device of the present invention may be a permanent installation or is available as an accessory item for use in virtually any type of vehicle.

It is accordingly to be understood in accordance with the above that a number of changes and modifications may be made in the preferred embodiment of the present invention without departing from the scope thereof, as defined by the appended claims.

What is claimed is:

1. A test meter instrument adapted for use in a motor vehicle to measure acceleration or deceleration characteristics under operating conditions, comprising a base, an instrument housing connected in pivotal relation to the base including a graduated scale with a vertical slot extending therealong and levelling indicia on the side of the housing with a notched portion in spaced vertical relation to the indicia, said housing being in the form of two interconnected halves and the interior surface of each half including aligned bosses to form a bearing and correspondingly upwardly inclining tracks located beneath said bearing tapering inwardly from the housing surface to define a spaced guideway, a ball dimensioned for free rolling movement along the guideway with said tracks contacting opposed points on the lower half of said ball, an indicator including a pivot pin for connection in journaled relation in said bearing, a pointer projecting forwardly for extension through the vertical slot in the housing and a lever curving downwardly from said pivot pin across the path of movement of said ball so as to be responsive to movement of said ball to cause movement of said pointer across the face of said scale.

2. A test meter instrument adapted for use in a motor vehicle to measure acceleration or deceleration characteristics under operating conditions, comprising a base, an instrument housing connected in pivotal relation to the base including an exterior graduated scale with a vertical slot extending therealong, said housing being in the form of two interconnected halves and the interior surface of each half including aligned bosses to form a bearing and correspondingly upwardly inclining tracks located beneath said bearing tapering inwardly from the housing surface to define a spaced guideway, a ball dimensioned for free rolling movement along the guideway with said tracks contacting opposed points on the lower half of said ball, an indicator including a pivot pin for connection in journaled relation in said bearing, a pointer projecting forwardly from said pivot pin for extension through the vertical slot in the housing and a lever curving downwardly from said pivot pin across the path of movement of said ball being freely responsive to movement of said ball to initiate movement of said pointer across the face of said scale.

References Cited in the file of this patent

UNITED STATES PATENTS

| | | |
|---|---|---|
| 1,801,878 | Petersen | Apr. 21, 1931 |
| 2,052,205 | Baughman | Aug. 25, 1936 |
| 2,085,310 | Gilliam | June 29, 1937 |
| 2,157,514 | Whipple | May 9, 1939 |
| 2,733,116 | Fantham et al. | Jan. 31, 1956 |

FOREIGN PATENTS

| | | |
|---|---|---|
| 301,774 | Great Britain | Dec. 3, 1928 |